Dec. 25, 1928.
R. J. McCARTY, JR
AUXILIARY LOCOMOTIVE
Filed April 19, 1926
1,696,610
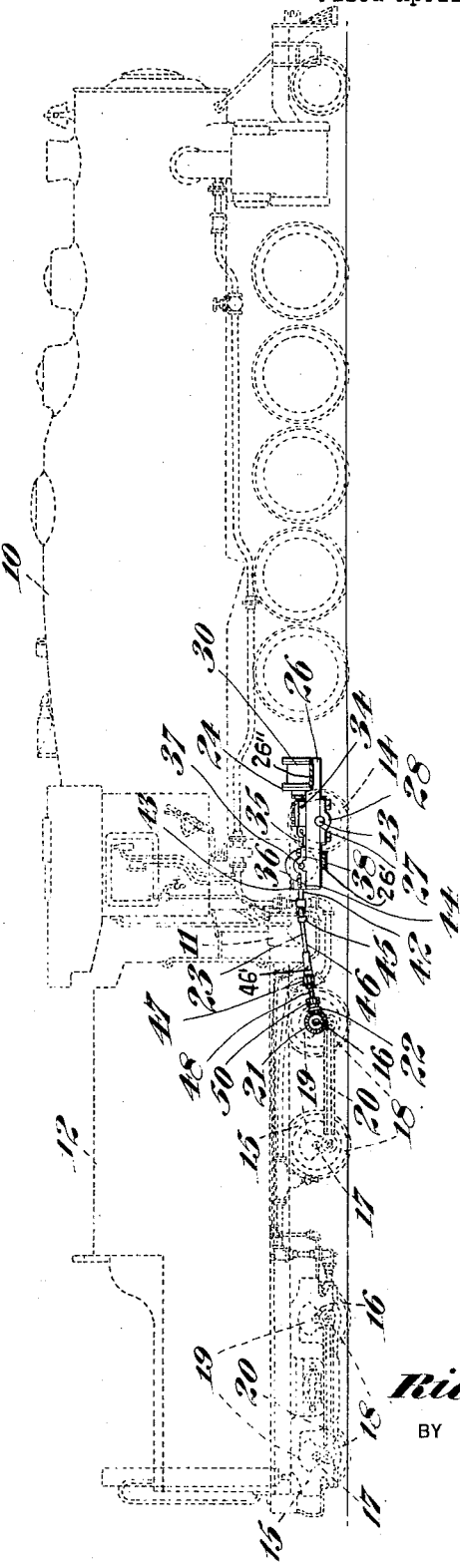
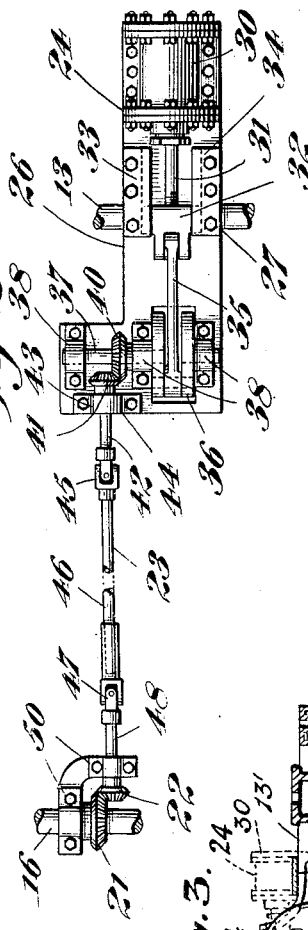
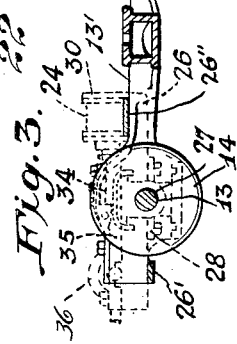
INVENTOR
*Richard J. McCarty, Jr.*
BY
*R. S. C. Dougherty*
ATTORNEY Patented Dec. 25, 1928.

1,696,610

UNITED STATES PATENT OFFICE.

RICHARD J. McCARTY, JR., OF BETHLEHEM, PENNSYLVANIA, ASSIGNOR TO BETHLEHEM STEEL COMPANY.

AUXILIARY LOCOMOTIVE.

Application filed April 19, 1926. Serial No. 102,916.

My invention relates to auxiliary propulsion devices for locomotives and it has for an object to provide improved apparatus of this character wherein power shall be applied to at least one of the load-bearing axles of a tender truck, such power being received from a propeller shaft, which, in turn, is driven by an auxiliary motor or engine carried by the locomotive proper.

A further object of my invention is to provide apparatus of the character referred to wherein the auxiliary propulsion motor or engine shall be mounted on a saddle frame pivotally mounted on the load-bearing axle of a trailer truck.

In the application of auxiliary propulsion motor devices to tender trucks, such trucks have to be specially designed in order that the motor and associated devices may be accommodated. In accordance with my present invention, I apply power to at least one of the wheeled load-bearing axles of the tender truck, but I have the auxiliary motor or engine carried by the locomotive proper, whereby a truck of standard design and with very little modification may be used with my arrangement. I prefer to apply power to at least one of the load-bearing axles of of a tender truck for the reason that the weight of the tender is utilized to give increased tractive effort and for the further reason that the pressure of the tender truck wheels on rails is more uniform, that is, such pressure is not varied due to pitching effects.

I prefer to mount the auxiliary propulsion motor on the upper side of a frame pivotally mounted on the load-bearing axle of the trailer truck. A suitable propeller shaft device, including universal joints, is employed to connect the crank shaft of the auxiliary propulsion motor or engine to at least one of the wheeled load-bearing axles of the tender truck. Preferably, the wheeled load-bearing axles of the tender truck are connected by linkage mechanism so that, the direct application of power to one of the axles by the auxiliary propulsion motor or engine also results in the application of power to the other of said axles.

These and other objects are effected by my invention as will be apparent from the following specification and claims, taken in connection with the drawings, forming a part of this application, in which:

Fig. 1 is a diagrammatic view showing a locomotive in side elevation with my improved auxiliary propulsion mechanism applied thereto.

Fig. 2 is a detail plan view showing the auxiliary propulsion motor or engine; and Fig. 3 is a vertical longitudinal sectional elevation taken on the center line of a trailer truck of standard design, illustrating in dotted lines the manner of attaching the saddle frame to the trailer truck frame.

Referring now to the drawings more in detail, I show a locomotive at 10 connected by any suitable means at 11 to a tender truck 12. The locomotive includes the usual trailer truck 13' having a load-bearing axle 13 and wheels 14. The tender is supported by a plurality of trucks 15 each of which preferably includes a pair of load-bearing axles 16 and 17 sustained by wheels 18.

Referring to Fig. 1, it will be seen that the load-bearing axles 16 and 17 of the forward tender truck are connected by suitable linkage mechanism so that, should power be applied to one of the axles, it will be transmitted to the other of said axles. For example, I show the axles provided with suitable crank devices 19 connected by side links 20.

The rear tender truck may also be connected by similar linkage mechanism as shown, although this may be dispensed with if desired.

One of the load bearing axles 16 or 17, preferably the former, has connected thereto, between the wheels, a gear 21, which meshes with a gear 22 carried by a propeller shaft device 23, the latter being driven by an auxiliary propulsion motor or engine at 24 carried by the locomotive proper.

I prefer to have the auxiliary propulsion motor or engine at 24 mounted upon the load-bearing axle 13 of the trailer truck; and, to this end, I show a saddle frame 26 secured to the trailer truck frame by means of tie bars 26' and 26'' and pivoted or journaled at 27 substantially midway of its length upon the axle 13. Any suitable means, for example, a strut member or plate 28 cooperates to hold the frame 26 in place with respect to the axle 13.

The saddle frame 26 has mounted thereon a reciprocating engine or motor of conventional design, this motor including a cylinder 30, arranged transversely of the axle 13, and having its piston connected to a piston rod 31, the latter also being connected to the cross head 32, which fits cross head guides 33 and 34 carried by the saddle frame 26. The cross head 32 is connected by the connecting rod 35, to a crank 36 on a crank shaft 37 journaled in bearings 38 carried by the frame 26.

Since the crank shaft 37 is arranged substantially parallel to the load-bearing axle 13, I prefer to connect the crank shaft to one of the load-bearing axles of the tender truck by the propeller shaft device 23 already referred to and which will now be more fully described.

The crank shaft 37 is provided with a driving bevel gear 40, which meshes with a bevel gear 41 carried by the forward section 42 of the propeller shaft device. The forward section 42 of the propeller shaft device is journaled in a bearing 43 carried by an upwardly extending lug or projection 44 at the rear end of the saddle frame 26. The forward portion 42 of the propeller shaft device is connected by a universal joint 45 to the intermediate telescoping shaft sections 46 and 46' of the propeller shaft device to allow for the movement of the draft rigging connection between the locomotive and the tender, the other end of the intermediate shaft section 46 being connected by universal joint 47 to a rearward shaft portion 48 having the bevel gear 22 thereon which meshes with the bevel gear 21 on the load-bearing axle 16. As will be seen from Fig. 2, the rearmost shaft section 48 is preferably journaled in a casing construction 50 mounted on the truck axle 16.

From the construction described, it will be apparent that I have provided an arrangement wherein the auxiliary propulsion motor or engine may be mounted on the trailer truck of the locomotive while power is applied to the tender truck thereof, without involving very much modification of the tender truck structure. The arrangement of the propeller shaft device including the universal joints 45 and 47 assures that articulated movement of the tender with respect to the locomotive may take place without disturbing the transmission of power from the auxiliary propulsion motor or engine, mounted on the trailer truck, to one of the load-bearing axles of the tender truck.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

Having thus described my invention what I claim as new and desire to secure by Letters Patent is:

1. In a locomotive arrangement, the combination of a plurality of load-bearing axles, a saddle frame pivotally mounted on one of said axles, a reciprocating engine carried by the frame and including a crank shaft arranged substantially parallel to the axle supporting said frame, a propeller shaft device, gearing between the propeller shaft device, and the crank shaft, and gearing between the other end of the propeller shaft device and the other of said load-bearing axles.

2. In a locomotive arrangement including a locomotive and a tender, the combination of a tender truck having wheeled load-bearing axles, an auxiliary propulsion motor carried by the locomotive, and means for transmitting motion from the motor to one of said axles.

3. In a locomotive arrangement including a locomotive and a tender, the combination of a tender truck having wheeled load-bearing axles, a reciprocating engine carried by the locomotive and including a crank shaft extending transversely thereof, a propeller shaft device, gearing between one end of the propeller shaft device and the crank shaft and gearing between the other end of the propeller shaft device and one of the axles of the tender truck.

4. In a locomotive arrangement including a locomotive and a tender, the combination of a tender truck having wheeled load-bearing axles, a trailer truck for the locomotive, an auxiliary propulsion motor mounted on the trailer truck, and means for transmitting motion from the motor to one of said tender truck axles.

5. In a locomotive arrangement including a locomotive and a tender, the combination of a tender truck having a plurality of wheeled load-bearing axles, a trailer truck including a wheeled load-bearing axle, a saddle frame pivotally mounted on the load-bearing axle of the trailer truck, an auxiliary propulsion motor carried by the saddle frame, and means for transmitting motion from the motor to one of the load-bearing axles of the tender truck.

6. In a locomotive arrangement including a locomotive and a tender, the combination of a tender truck having a plurality of wheeled load-bearing axles, link mechanism for connecting said axles, a trailer truck for the locomotive and including a wheeled load-bearing axle, a saddle frame pivotally mounted on the trailer truck, a reciprocating engine carried by the saddle frame and including a crank shaft arranged substantially parallel to the load-bearing axle of the trailer truck, a propeller shaft device, gearing between one end of the propeller shaft device and the crank shaft, and gearing between the other end of the propeller shaft device and one of the load-bearing axles of said tender truck.

7. In a locomotive arrangement including a locomotive and a tender, the combination of a tender truck having load-bearing axles, a trailer truck for the locomotive, an auxiliary propulsion motor carried by the trailer truck, and a telescoping connection for transmitting motion from the motor to one of the axles of the tender truck.

8. In a locomotive arrangement including a locomotive and a tender, the combination of a tender truck having load-bearing axles, a trailer truck for the locomotive, a saddle frame mounted on said trailer truck, an auxiliary propulsion motor carried by the saddle frame, and a telescoping connection for transmitting motion from the motor on the saddle frame to one of the axles of the tender truck.

9. In a locomotive arrangement including a locomotive and a tender, the combination of a tender truck having load-bearing axles, a trailer truck for the locomotive, an auxiliary propulsion motor mounted on the trailer truck, a telescoping propeller shaft driven by the motor, and gearing for connecting the propeller shaft to one of said axles.

10. In a locomotive arrangement including a locomotive and a tender, the combination of a tender truck having load-bearing axles, a trailer truck for the locomotive, an auxiliary propulsion motor mounted on the trailer truck, a telescoping propeller shaft driven by the motor and extending transversely of said load-bearing axles, and gearing for connecting the propeller shaft to one of said axles.

In testimony whereof I hereunto affix my signature this 5th day of April 1926.

RICHARD J. McCARTY, Jr.